US005745270A

United States Patent [19]
Koch

[11] Patent Number: 5,745,270
[45] Date of Patent: Apr. 28, 1998

[54] METHOD AND APPARATUS FOR MONITORING AND CORRECTING INDIVIDUAL WAVELENGTH CHANNEL PARAMETERS IN A MULTI-CHANNEL WAVELENGTH DIVISION MULTIPLEXER SYSTEM

[75] Inventor: Thomas Lawson Koch, Holmdel, N.J.

[73] Assignee: Lucent Technologies Inc., Murray Hill, N.J.

[21] Appl. No.: 625,265

[22] Filed: Mar. 28, 1996

[51] Int. Cl.$^6$ .................................................. H04J 14/02
[52] U.S. Cl. ........................... 359/124; 359/130; 385/24; 385/37
[58] Field of Search .................................... 359/124, 130, 359/133, 161, 162, 115, 110; 385/24, 37

[56] References Cited

U.S. PATENT DOCUMENTS 5,233,462  8/1993  Wong ..................................... 359/330
5,390,185  2/1995  Hooijmans et al. ..................... 359/124
5,589,970  12/1996  Lyu et al. ............................... 359/133

Primary Examiner—Kinfe-Michael Ngash

[57]  ABSTRACT

A system and associated method for determining if a channel signal carried by a discrete wavelength channel is properly centered for that wavelength channel. A signal generator is provided that superimposes a secondary signal over the original signal in a signal channel. Tone detectors are provided at a point after the superimposition of the secondary signal. The tone detectors detect the superimposed tone signal at wavelengths that are longer and/or shorter than the wavelength assigned to the wavelength channel. By measuring the degree of balance between wavelengths longer than the wavelength assigned to the wavelength channel and the wavelengths shorter than the wavelength assigned to the wavelength channel, it can be determined if the original signal is centered for that wavelength channel. If a predetermined degree of balance is not obtained, the original signal for the wavelength channel can be corrected or can be recognized as being non-compliant.

25 Claims, 4 Drawing Sheets

METHOD AND APPARATUS FOR MONITORING AND CORRECTING INDIVIDUAL WAVELENGTH CHANNEL PARAMETERS IN A MULTI-CHANNEL WAVELENGTH DIVISION MULTIPLEXER SYSTEM

BACKGROUND OF THE INVENTION

1. Field of the Invention

The present invention relates to wavelength division multiplexer (WDM) systems where individual wavelength channels are combined at a single output port. More specifically, the present invention relates to systems for monitoring and correcting wavelength parameters for the individual wavelength channels being combined within a WDM system.

2. Prior Art Statement

Within wavelength division multiplexer transmission and networking systems, individual wavelength channels are often multiplexed at a single port for transmission to another node. Referring to FIG. 1, such a prior art multiplexer system 10 is shown. Typically, at the same points in a WDM system, individual wavelength channels will contain signals that are intended to be at the correct wavelength assignment prior to multiplexing. These signals are termed compliant signals, and are multiplexed without correction. However, at some points in a WDM system, some of the individual wavelength channels 12 may contain non-compliant signals, wherein the non-compliant signals are at wavelengths that are unacceptable for system function. As a result, non-compliant wavelength channels 12 could be fed into a converter 14 where the non-compliant signals are converted or locally regenerated into corrected signals having the appropriate wavelength parameters.

As is shown by FIG. 1, in the prior art non-compliant wavelength channels 12 are first corrected and then the corrected signals from the non-compliant wavelength channels 12 are combined with the signals from the compliant wavelength channels 16 at a power combiner 20. The power combiner 20 combines the various signals and provides a multiplexed signal at a single output port 22. The combiner could be a wavelength selective combiner that can operate in principle with no inherent insertion loss. More typically the combiner would be a wavelength non-selective power combiner with an inherent insertion loss.

A disadvantage of such multiplexer configurations, such as that shown in FIG. 1, is that such configurations do not provide the capability to monitor certain parameters of the optical signal at each wavelength channel. Furthermore, such prior art configurations do not provide a means for checking if the compliant signals are indeed centered at the wavelength specified for a given channel or if corrected non-compliant signals have been properly corrected. In general, it would be desirable to either reject or correct signals that are not centered at the wavelength specified for a given channel to prevent those signals from interfering with signals on other channels and affecting the performance of the system.

A need therefore exists in the art of wavelength division multiplexer systems for a multiplexer configuration that detects whether compliant signals are truly compliant and also whether non-compliant signals have been properly corrected to true compliant signals.

A need also exists in the art of wavelength division multiplexer systems for a multiplexer configuration that allows for the automatic correction of signals to ensure that compliant signals are truly compliant and non-compliant signals are properly corrected, or alternatively allows for the rejection of signals that are not at their intended wavelength.

SUMMARY OF THE INVENTION

The present invention is a system and associated method for determining if a channel signal carried by a discrete wavelength channel is properly centered for that wavelength channel. A signal generator is provided that superimposes a secondary signal over the original signal in a signal channel. The secondary signal preferably is an intensity modulated tone signal with a shallow modulation depth and having a single continuous frequency and amplitude, wherein the frequency serves to tag or identify the wavelength channel upon which the secondary signal is superimposed. This establishes a correspondence between a particular tone or secondary signal and the optical signal that is intended to occupy the wavelength channel assigned to that tone or secondary signal.

These tones or secondary signals can be used in conjunction with suitably configured optical filters to detect whether an optical signal is properly centered at its correct wavelength on the channel it is intended to occupy. Tone detectors are provided at a point after the superimposition of the secondary signal. The tone detectors detect the amount of the superimposed tone signal that pass through filters centered at wavelengths longer and/or shorter than the wavelength assigned to the wavelength channel. By measuring the degree of balance between the signal passing through a filter centered at a wavelength longer than the wavelength assigned to the wavelength channel and one centered at a wavelength shorter than the wavelength assigned to the wavelength channel, it can be determined if the original signal is currently centered at the wavelength intended for that wavelength channel. If a predetermined degree of balance is not obtained, the original signal for the wavelength channel can be corrected or can be recognized as being non-compliant and rejected or used to activate an alarm condition. The filters used to accomplish this can be integrated into the function of the multiplexer with little additional cost if a properly designed wavelength selective multiplexer is employed.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention apparatus and method can be used in many applications where the accuracy of a wavelength frequency for a given wavelength channel is to be tested, the present invention apparatus and method are especially well suited for use in a wavelength division multiplexer (WDM) system. Accordingly, by way of example, the present invention apparatus and method will be described as part of a WDM system.

Figure 2:
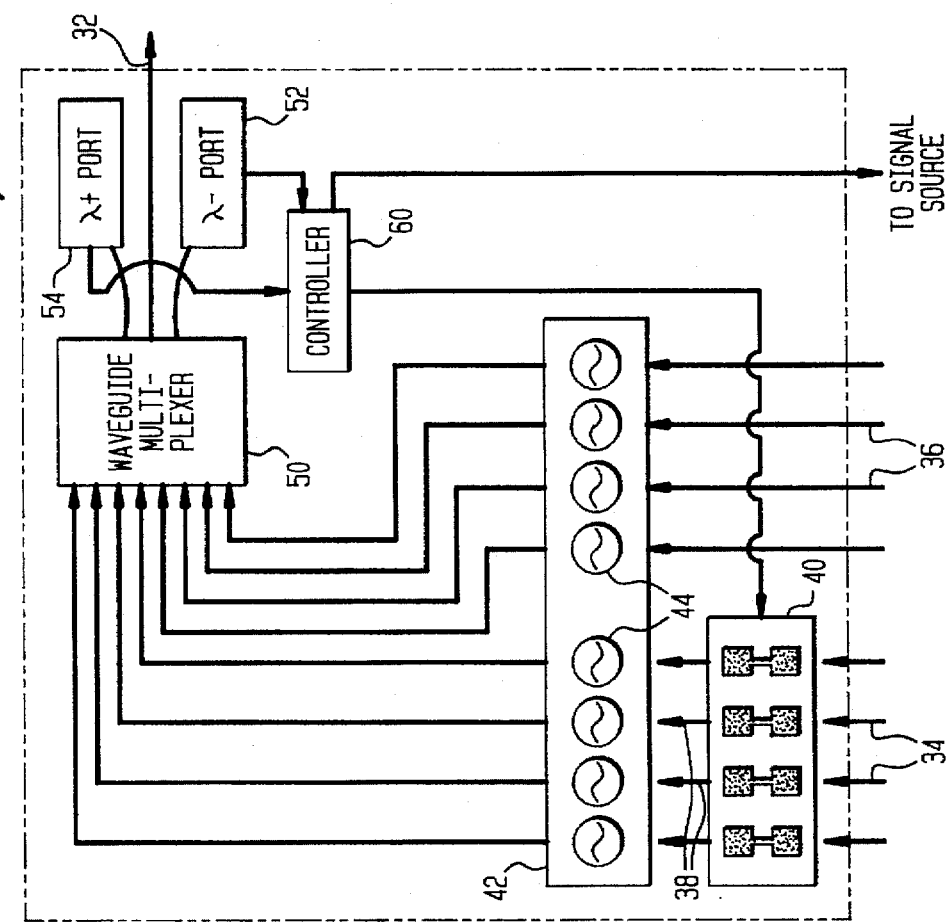
FIG. 2 is a schematic of one preferred embodiment of the present invention wavelength channel multiplexer system for combining signals from compliant and non-compliant wavelength channels.
Figure 1:
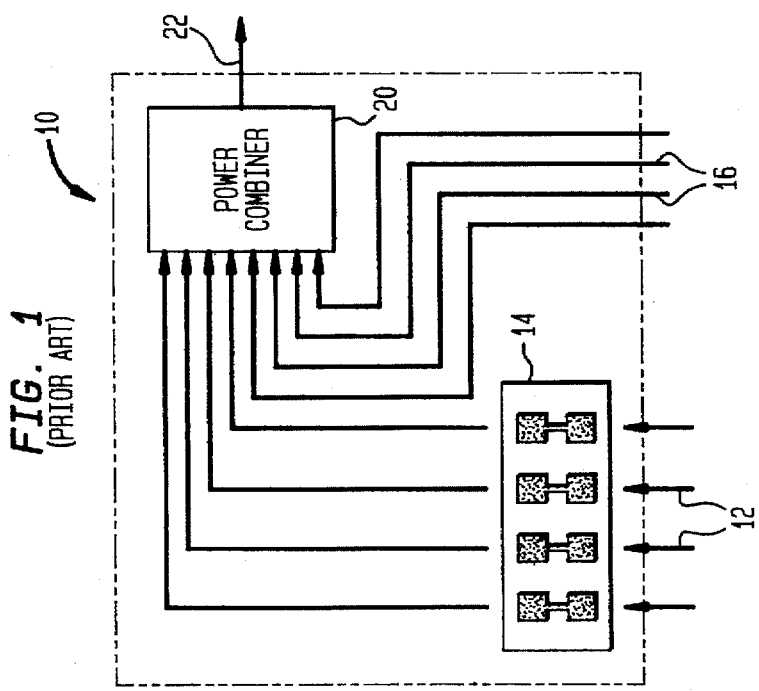
FIG. 1 is a schematic view of a prior art wavelength channel multiplexer system for combining signals from compliant and non-compliant wavelength channels.

Referring to FIG. 2, there is shown a preferred embodiment of a multiplexer configuration 30 for combining individual wavelength channels at a single output port 32. Of the individual wavelength channels to be combined, some of the wavelength channels are non-compliant channels 34, while the remainder of the wavelength channels are compliant channels 36. The non-compliant channels 34 contain wavelength signals that are expected to be unacceptable for system function, while the compliant channels 36 contain wavelength signals that are intended to be in the correct form for multiplexing. To correct the non-compliant channels 34, the wavelength signals carried by the non-compliant channels 34 are converted into compliant wavelength signals 38 by a wavelength converter 40. It will be understood that depending upon the nature of the non-compliant channels 34, the wavelength converter 40 may contain means for locally regenerating a non-compliant signal into the format of a compliant signal. Such wavelength converters 40 are well known in the art, and could be conventional optical regenerators that typically detect all wavelengths encountered in the system but could transmit at the particular wavelength specified for the complaint channels.

The compliant wavelength signals from the compliant channels 36 and the compliant converted wavelength signals 38 from the wavelength converter 40, are then input into a modulator bank 42. The modulator bank 42 contains a plurality of modulators 44 that superimpose a set of distinct intensity modulated signals or tones over each incoming wavelength channel, be that incoming channel a compliant channel 36 or a converted non-compliant channel 34. The compliant wavelength signals from the compliant channels 36 and the compliant converted wavelength signals 38 from the wavelength converter 40, along with their corresponding superimposed intensity modulated tones, are received by a waveguide multiplexer 50. Although the shown embodiment uses a bank of modulators, it will be understood that any signal generator means can be used provided the signal generator means produces a tone signal capable of identifying the intended channel that the signal is supposed to occupy, and does not preclude that original from carrying its intended channel information.

Figure 4:
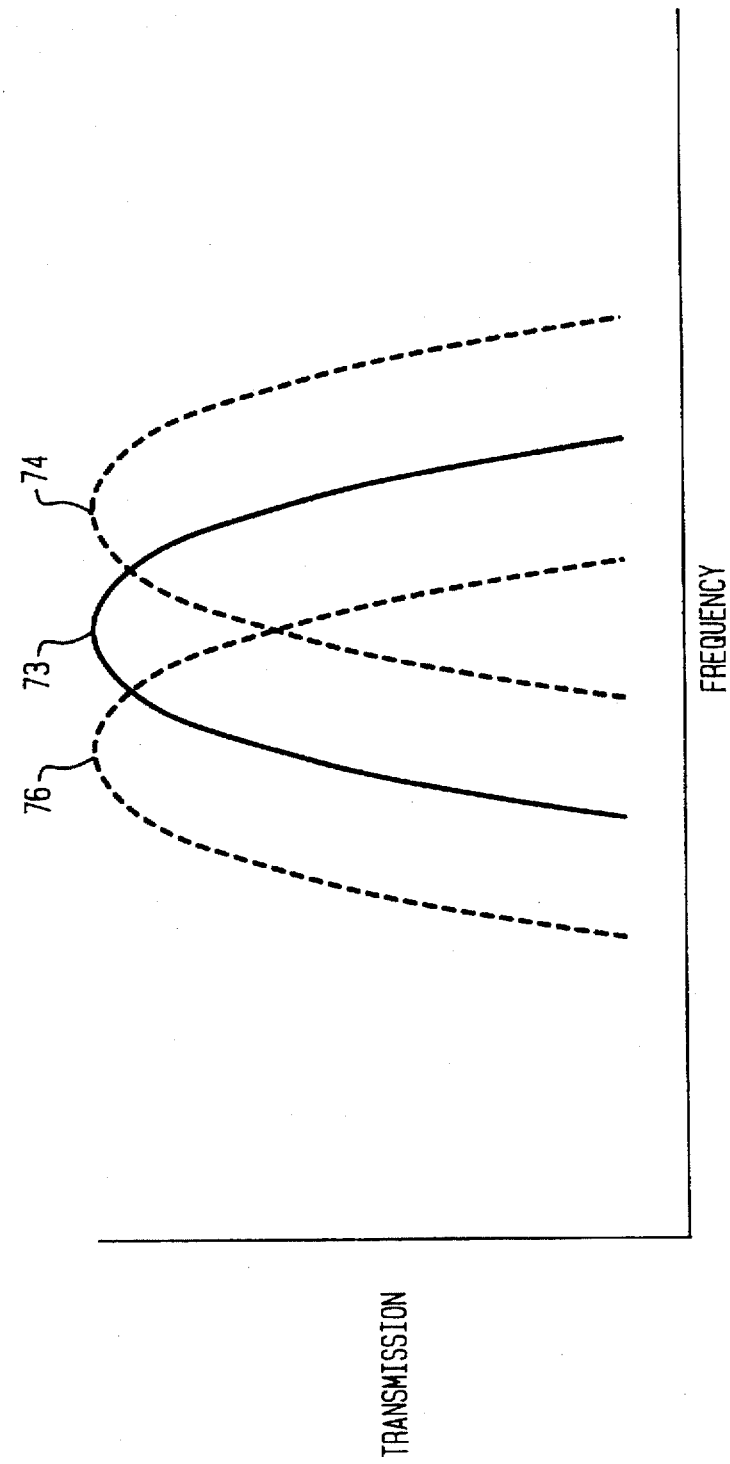
FIG. 4 shows a preferred multiplexer response produced by the present invention wavelength channel multiplexer system for a single wavelength channel input to a particular input port and measured through a principal output port and two auxiliary output ports.

A short wavelength ($\lambda_-$)tone detector 52 and a long wavelength ($\lambda_+$)tone detector 54 are provided at the output of the waveguide multiplexer 50. The waveguide multiplexer 50 attempts to multiplex all incoming wavelength channels, thereby providing a single multiplexed signal at the main output port 56 of the waveguide multiplexer 50. The $\lambda_-$ tone detector 52 and the $\lambda_+$ tone detector 54 monitor the amplitude of the intensity modulated tone superimposed over each of the wavelength channels by the modulators 44 in the modulator bank 42. In the preferred embodiment, the waveguide multiplexer 50 provides an overlapping response such as that shown in FIG. 4. This multiplexer characteristic is different from that usually contemplated in the art. Most commonly in the prior art, wavelength-selective combining is accomplished using a demultiplexer running in reverse, however, the demultiplexers are specifically designed to have as low a crosstalk as possible and thus would not have overlapping responses as shown in FIG. 4. In the multiplexer function cross talk is not a concern since the signals are combined to a single port anyway. To achieve the overlapping response shown in FIG. 4, a very small portion of each signal must be routed to ports other than the principal output port, however, the loss associated with this routing can be made insignificant and does not impair the function of the multiplexer. Due to the designed overlapping response of the multiplexer ports, some portion of the intensity modulated tone for a specific wavelength channel will be detected by the $\lambda_-$ tone detector 52. Similarly, due to the designed overlapping response of the multiplexer ports, as shown in FIG. 4, some portion of the intensity modulated tone for a specific wavelength channel is detected by the $\lambda_+$ tone detector 54.

Figure 3:
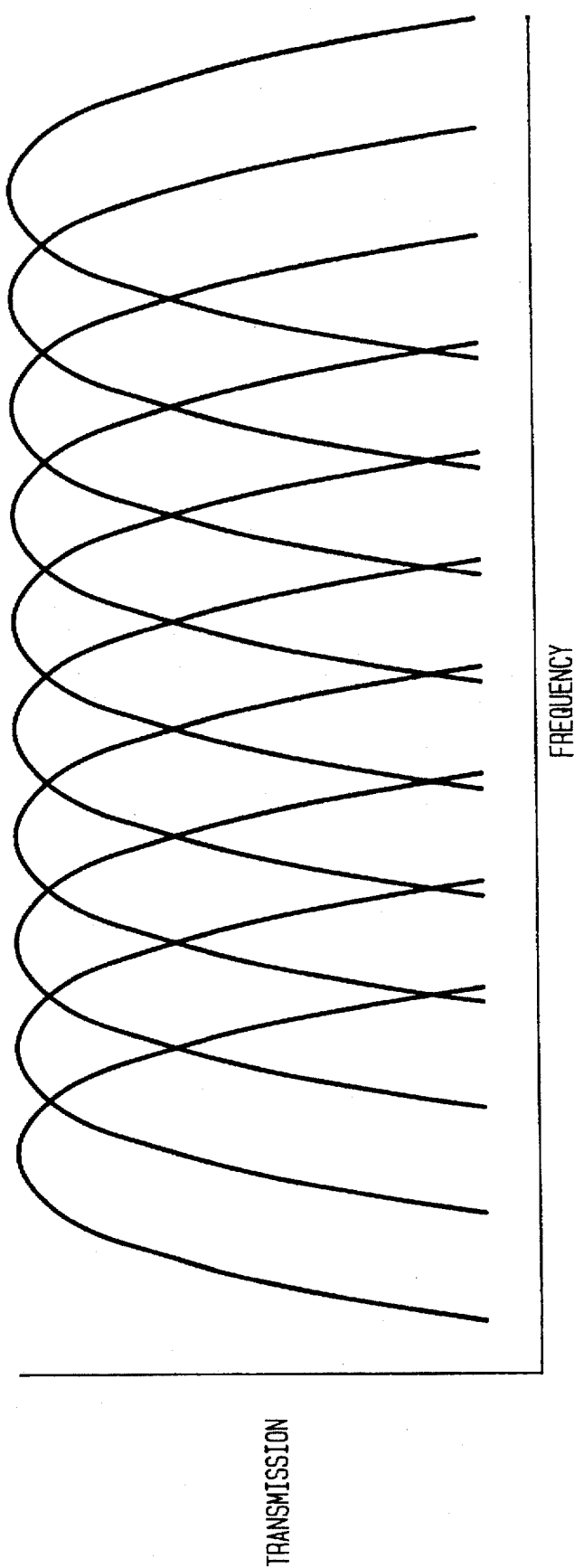
FIG. 3 shows a superposition of representative filter response functions of a multiplexer as measured at a particular output port for successive input ports in a preferred embodiment of the multiplexer system, wherein the successive response curves include overlapping bands from adjacent input ports.

The overlapping response functions as depicted in FIG. 3 and FIG. 4 have two important features. First, it is important that each of the filter responses for the $\lambda_+$ and $\lambda_-$ ports have reasonably well-behaved, monotonic sloping sides on the response curves. Secondly, it is desirable that the filter response for the $\lambda_+$ and $\lambda_-$ ports overlap such that the point of overlap is centered at the center of the filter response of the principal output port. Furthermore, the filter responses for the $\lambda_+$ and $\lambda_-$ ports should be small on the sloping sides of the filter response at the center wavelength of the principal output port. However, the filter response at this wavelength must still be significant enough such that the presence of a signal centered at the center wavelength for the principal output port is easily detected. This way, balancing the outputs of the $\lambda_+$ and $\lambda_-$ filters would insure that the channel is properly centered on the filter response of the principal output port. The exact centering is not essential, however. Since the outputs of the $\lambda_+$ and $\lambda_-$ filters are fed into tone detectors, subsequent electronics can be adjusted to weigh the two outputs unequally, and one can thereby compensate for any deviation from perfect centering of the overlap point of the filter responses for the $\lambda_+$ and $\lambda_-$ ports and the center of the filter response for the principal output port.

The signal for each of the wavelength channels is therefore monitored to detect the degree of negative and positive noncompliance. As a result, the degree of centering for each wavelength channel can be determined. For a wavelength channel to be truly compliant, the intensity modulated tone superimposed over that wavelength channel would be equally detected by both the $\lambda_-$ tone detector 52 and the $\lambda_+$ tone detector 54. Any imbalance between the intensity modulated tone detected by the $\lambda_-$ tone detector 52 and the $\lambda_+$ tone detector 54 would indicate that the signal traveling along a specific wavelength channel is not truly compliant.

After a determination has been made as to whether a signal for a given wavelength channel is truly compliant, that information can be used to reject or correct the signal in question. As is indicated by FIG. 2, a controller 60 is provided that is coupled to both the $\lambda_-$ tone detector 52 and the $\lambda_+$ tone detector 54. The controller 60 can be coupled to the wavelength converter 40 and the compliant channel signal generators (not shown). Alternatively, the controller can be coupled to the modulator bank 42, wherein the controller 60 can cause the modulator bank 42 to extinguish any truly non-compliant signal. If the controller 60 recognizes an imbalance between what is detected by the $\lambda_-$ tone detector 52 and the $\lambda_+$ tone detector 54 for one of the original non-compliant wavelength channels 34, then the controller 60 instructs the wavelength converter 40 to correct the imbalance, ignore the non-compliant channel found out of balance, or the modulator bank 42 is instructed to extinguish the non-compliant channel. Similarly, if the controller 60 recognizes an imbalance between what is detected by the $\lambda_-$ tone detector 52 and the $\lambda_+$ tone detector 54 for one of the original compliant wavelength channels 36, then the controller 60 instructs the appropriate compliant channel signal generator (not shown) to correct the imbalance, stop the signal or the modulator bank 42 is instructed to extinguish the non-compliant channel.

In the embodiment of FIG. 2, the modulator bank 42 used for imposing the intensity modulated tone over each wavelength channel was positioned just prior to the waveguide multiplexer 50. Such a configuration is merely exemplary and it should be understood that an intensity modulated tone can be superimposed over both the converted non-compliant channels 38 and the compliant channels 36 at any point on the channels, including the point of signal origin for both the non-compliant channels 34 and compliant channels 36. It should also be understood that the use of a tone signal is also only exemplary. As such, any form of modulation of the signal that serves to identify a particular input path to the multiplexer 50 allows the system to function, provided the modulation can be detected at the $\lambda_-$ tone detector 52 and the $\lambda_+$ tone detector 54. The modulation of the signal is preferably done via a tone, however other modulation techniques can be used.

FIG. 3 and FIG. 4 show graphs plotting transmission verses optical frequency for a multiplexer designed to have overlapping transmission curves. In FIG. 3, the graph shows a superposition of the transmission verses optical frequency curves for successive input ports of the multiplexer as measured from the principal output port. In FIG. 4, the graph shows the superposition of the transmission verses optical frequency for light coming into a particular input port of the multiplexer and being measured successively from the $\lambda_-$ output port, the principal output port and the $\lambda_+$ output port, as indicated by waveform 74, waveform 73 and waveform 76, respectively.

Figure 5:
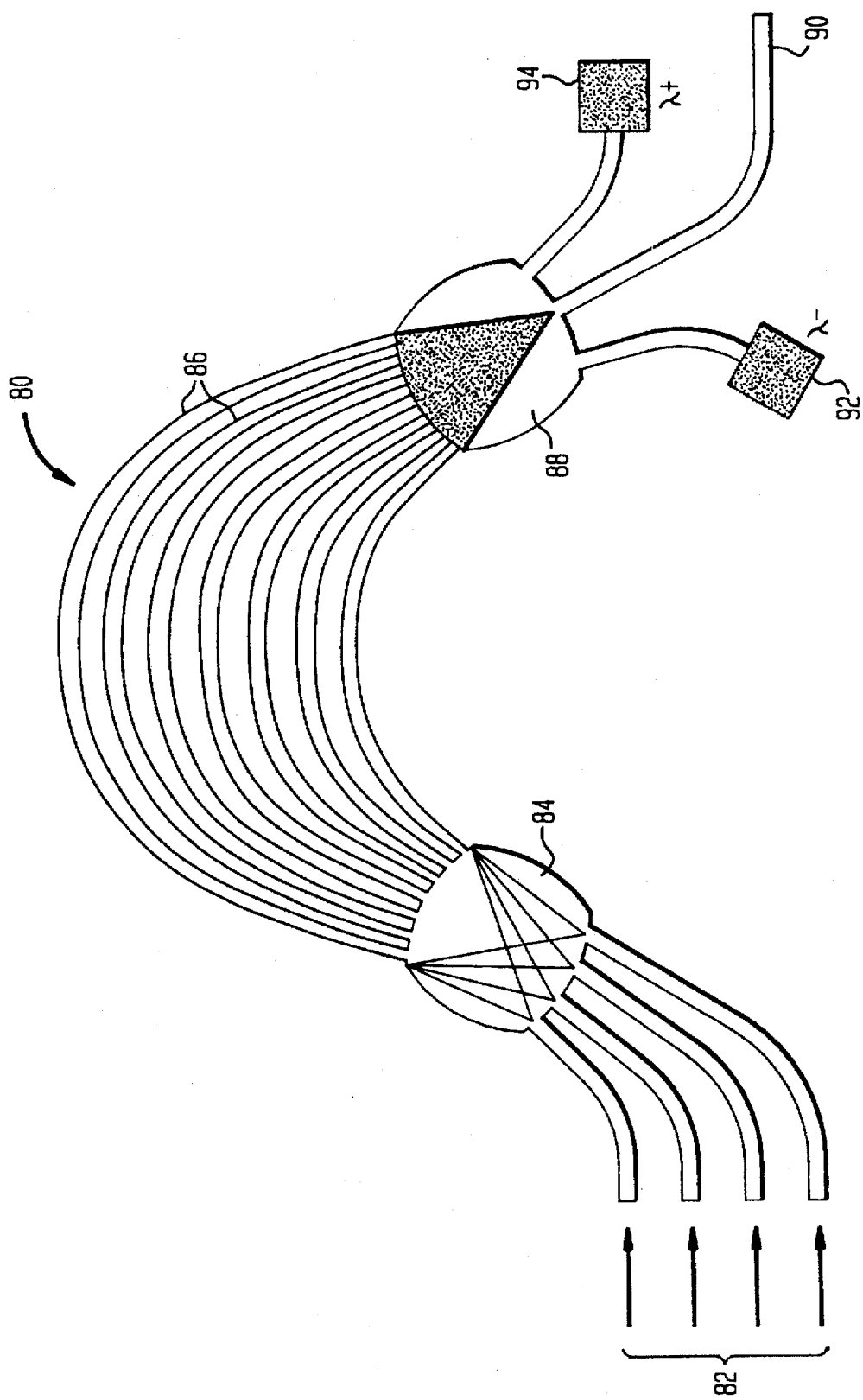
FIG. 5 is a particular embodiment of the present invention wavelength channel multiplexer system including a waveguide grating router.

In the embodiment of FIG. 2, a multiplexer 50 is used to multiplex the various incoming wavelength channels. Referring to FIG. 5, a particular embodiment of the multiplexer is shown, wherein the multiplexer is a waveguide grating router 80. In FIG. 5, it can be seen that the waveguide grating router 80 receives various wavelength channels 82, passes the signals through a first free space region 84 and directs the signals through a plurality of different path length arms 86. The signals are then recombined at a second free space region 88. By positioning the main output port 90 between a $\lambda_-$ signal detector port 92 and a $\lambda_+$ signal detector port 94, a natural configuration is provided wherein signals can be combined in a wavelength selective fashion, and provide the desired monitor function.

Thus, as can be seen, by superimposing an intensity modulated tone over each wavelength channel, prior to any modulating or combining step, each wavelength channel can be monitored to see if the signal it carries is properly centered. Furthermore, a detection of a signal not being properly centered on its wavelength channel can be used to modify the signal and correct the error. Additionally, the superimposed intensity modulated tone can be used as a tag for each signal after multiplexing to enable performance monitoring downstream without the need for expensive spectral measurement equipment.

It will be understood that the embodiments described above are merely exemplary and a person skilled in the art can produce alternate embodiments of the described invention using alternate configurations and/or functionally equivalent components. All such alternate components and configurations are intended to be included in the scope of the present invention as set forth by the appended claims.

What is claimed is:

1. A system for determining if a channel signal assigned to a channel of a discrete wavelength is centered at said discrete wavelength, comprising:

a signal generator source, coupled to said channel, for superimposing a secondary signal over said channel signal; and at least one signal detector for detecting whether said secondary signal superimposed over said channel signal is maintained at a wavelength center relative to said discrete wavelength, wherein said at least one signal detector is configured to include a first detector for detecting said secondary signal at wavelengths longer than said discrete wavelength and a second detector for detecting said secondary signal at wavelengths shorter than said discrete wavelength.

2. The system according to claim 1, wherein said secondary signal is intensity modulated.

3. The system according to claim 1, wherein said secondary signal has a single continuous frequency and amplitude.

4. The system according to claim 4, further including means for determining if said secondary signal detected by said first detector and said secondary signal detected by said second detector are balanced.

5. The system according to claim 4, wherein said means for determining includes optical filters preceding said first and said second detectors, said filters having overlapping response curves.

6. The system according to claim 5, wherein said overlapping response curves overlap at or near said discrete wavelength.

7. The system according to claim 6, wherein said overlapping response curves are monotonically sloping with opposite slopes near the region of overlap.

8. A system for combining a plurality of channel signals into a single output, wherein each channel signal originates from a channel assigned to a discrete wavelength, said system comprising:

signal generator source, coupled to each said channel, for superimposing a distinct secondary signal over each said channel signal;

multiplexer for combining each said channel signal at a single output;and at least one signal detector for detecting whether each said distinct secondary signal superimposed over each said channel signal is centered relative to said discrete wavelength for that channel signal, wherein said at least one signal detector is configured to include a first detector for detecting secondary signals at wavelengths longer than said discrete wavelength for each said channel and a second detector for detecting secondary signals at wavelengths shorter than said discrete wavelength for each said channel.

9. The system according to claim 8, wherein each said secondary signal is intensity modulated.

10. The system according to claim 8, wherein each said secondary signal has a single continuous frequency and amplitude.

11. The system according to claim 8 further including correcting means for correcting a channel signal found not to be centered by said at least one detector.

12. The system according to claim 8, wherein each channel signal is produced by a signal source, and said correcting means includes a controller coupled to said first detector, wherein if said second detector and the signal source for the channel signal found not to be centered, said controller modifies said signal source to correct the channel signal found not to be centered.

13. The system according to claim 8, further including means for determining if the secondary signal at wavelengths detected by said first detector and the secondary signal at wavelengths detected by said second detector are balanced.

14. The system according to claim 13, wherein said means for determining includes optical filters preceding said first and said second detectors, said filters having overlapping response curves.

15. The system according to claim 14, wherein said overlapping response curves overlap at or near said discrete wavelength.

16. The system according to claim 15, wherein said overlapping response curves are monotonically sloping with opposite slopes near the region of overlap.

17. A system for combining a plurality of channel signals into a single output, wherein each channel signal originates from a channel assigned to a discrete wavelength, said system comprising:

signal generator source, coupled to each said channel, for superimposing a distinct secondary signal over each said channel signal;

multiplexer for combining each said channel signal at a single output; and at least one signal detector for detecting whether each said distinct secondary signal superimposed over each said channel signal is centered relative to said discrete wavelength for that channel signal, wherein said multiplexer includes a waveguide grating and waveguide grating router ports, said ports having overlapping optical response curves.

18. The system according to claim 17, wherein said overlapping response curves overlap at or near said discrete wavelength.

19. The system according to claim 18, wherein said overlapping response curves are monotonically sloping with opposite slopes near the region of overlap.

20. In a system for combining a plurality of channel signals into a single output, wherein each channel signal originates from a channel assigned to a discrete wavelength, a method of controlling said system comprising the steps of:

superimposing a secondary signal over each said channel signal;

detecting signal wavelengths having a wavelength longer than said discrete wavelength;

detecting signal wavelengths having a wavelength shorter than said discrete wavelength; and determining if the signal wavelengths longer than said discrete wavelength and the signal wavelengths shorter than said discrete wavelength are balanced.

21. The method according to claim 20, further including the step of correcting each said channel signal found to be not balanced between said signal wavelengths longer than said discrete wavelength and said signal wavelengths shorter than said discrete wavelength.

22. The method according to claim 20, wherein each said secondary signal is intensity modulated.

23. The method according to claim 20, wherein each said secondary signal has a tone signal having a single continuous frequency and amplitude.

24. The method according to claim 20, wherein each said channel signal is produced by a signal source, and said step of correcting includes altering said channel signal at said signal source.

25. In a system for combining a plurality of channel signals into a single output, wherein each channel signal originates from a channel assigned to a discrete wavelength, a method of controlling said system comprising the steps of:

superimposing a secondary signal over each said channel signal;

detecting whether said secondary signal superimposed over each said channel signal is centered relative to the discrete wavelength for each said channel signal; and eliminating each said channel signal found not to be centered at its discrete wavelength.

* * * * *

UNITED STATES PATENT AND TRADEMARK OFFICE
CERTIFICATE OF CORRECTION

PATENT NO. : 5,745,270
DATED : Apr. 28, 1998
INVENTOR(S) : Thomas Lawson Koch

It is certified that error appears in the above-identified patent and that said Letters Patent is hereby corrected as shown below:

Column 6, line 30, replace "claim 4" with --claim 1--

Signed and Sealed this

Twenty-fifth Day of April, 2000

*Attest:*

Q. TODD DICKINSON

*Attesting Officer*  *Director of Patents and Trademarks*